(12) United States Patent
Moe

(10) Patent No.: US 9,707,517 B2
(45) Date of Patent: Jul. 18, 2017

(54) ELECTRODIALYSIS METHOD AND APPARATUS FOR PASSIVATING SCALING SPECIES

(71) Applicant: General Electric Company, Schenectady, NY (US)

(72) Inventor: Neil Edwin Moe, Singapore (SG)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/092,112

(22) Filed: Apr. 6, 2016

(65) Prior Publication Data
US 2016/0214061 A1    Jul. 28, 2016

Related U.S. Application Data

(62) Division of application No. 13/234,232, filed on Sep. 16, 2011, now Pat. No. 9,339,765.

(51) Int. Cl.
| | |
|---|---|
| B01D 61/46 | (2006.01) |
| B01D 61/44 | (2006.01) |
| B01D 61/58 | (2006.01) |
| C02F 1/469 | (2006.01) |
| B01D 61/02 | (2006.01) |

(52) U.S. Cl.
CPC ............ *B01D 61/46* (2013.01); *B01D 61/44* (2013.01); *B01D 61/58* (2013.01); *C02F 1/4693* (2013.01); *B01D 61/025* (2013.01)

(58) Field of Classification Search
CPC ....... B01D 61/46; B01D 61/58; C02F 1/4693; C02F 1/4602; C02F 2303/22
See application file for complete search history.

(56) References Cited

U.S. PATENT DOCUMENTS

| | | | | |
|---|---|---|---|---|
| 3,341,441 | A | * 9/1967 | Giuffrida | ............... B01D 61/52 204/525 |
| 6,274,018 | B1 | 8/2001 | Hidaka | |

(Continued)

FOREIGN PATENT DOCUMENTS

| | | |
|---|---|---|
| JP | 2001239270 A | 9/2001 |
| JP | 2009125738 A | 6/2009 |
| JP | 2010264385 A | 11/2010 |

OTHER PUBLICATIONS

Unofficial English Translation of Chinese Office Action issued in connection with corresponding CN Application No. 201280044811 on Mar. 1, 2016.

(Continued)

*Primary Examiner* — Arun S Phasge
(74) *Attorney, Agent, or Firm* — Wegman, Hessler & Vanderburg

(57) ABSTRACT

In one embodiment, this invention relates to an electrodialysis device comprising an inlet for directing a feed stream into a plurality of first feed paths and a plurality of second feed paths; the feed stream is comprised of a first anionic scaling species and a first cationic scaling species; the first cationic scaling species is transferred from the second feed paths to the first feed paths through a first membrane group, the first anionic scaling species is transferred from the first feed paths to the second feed paths through the first membrane group. In another embodiment, this invention relates to a method for passivating scaling species in an electrodialysis device.

6 Claims, 11 Drawing Sheets

(56) References Cited

U.S. PATENT DOCUMENTS

2001/0037942 A1 11/2001 Schmidt et al.
2008/0067125 A1* 3/2008 Wilkins ................ B01D 61/58
                                                      210/641

OTHER PUBLICATIONS

Unofficial English Translation of Japanese Office Action issued in connection with corresponding JP Application No. 2014530680 on Jun. 7, 2016.

* cited by examiner

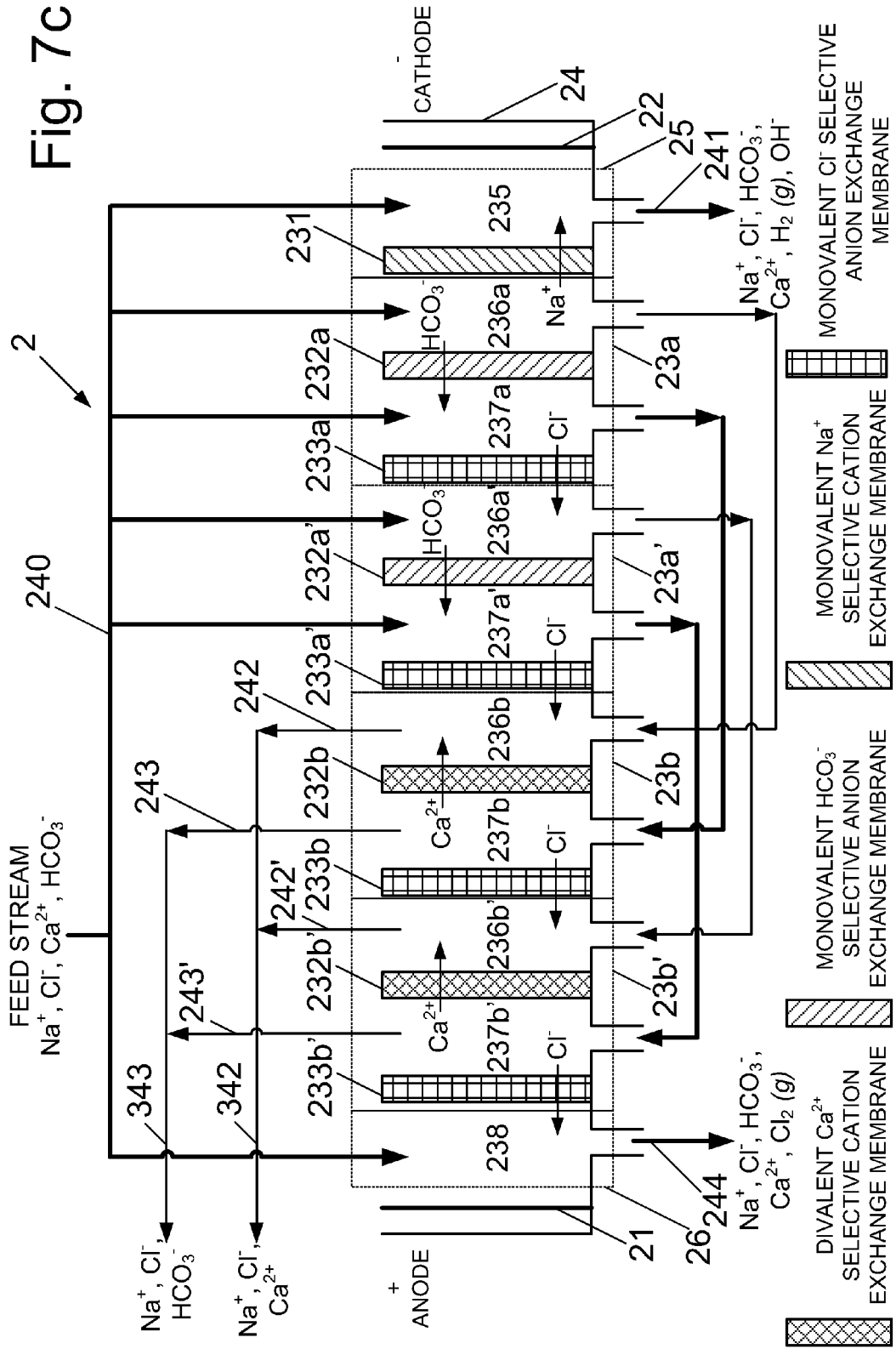

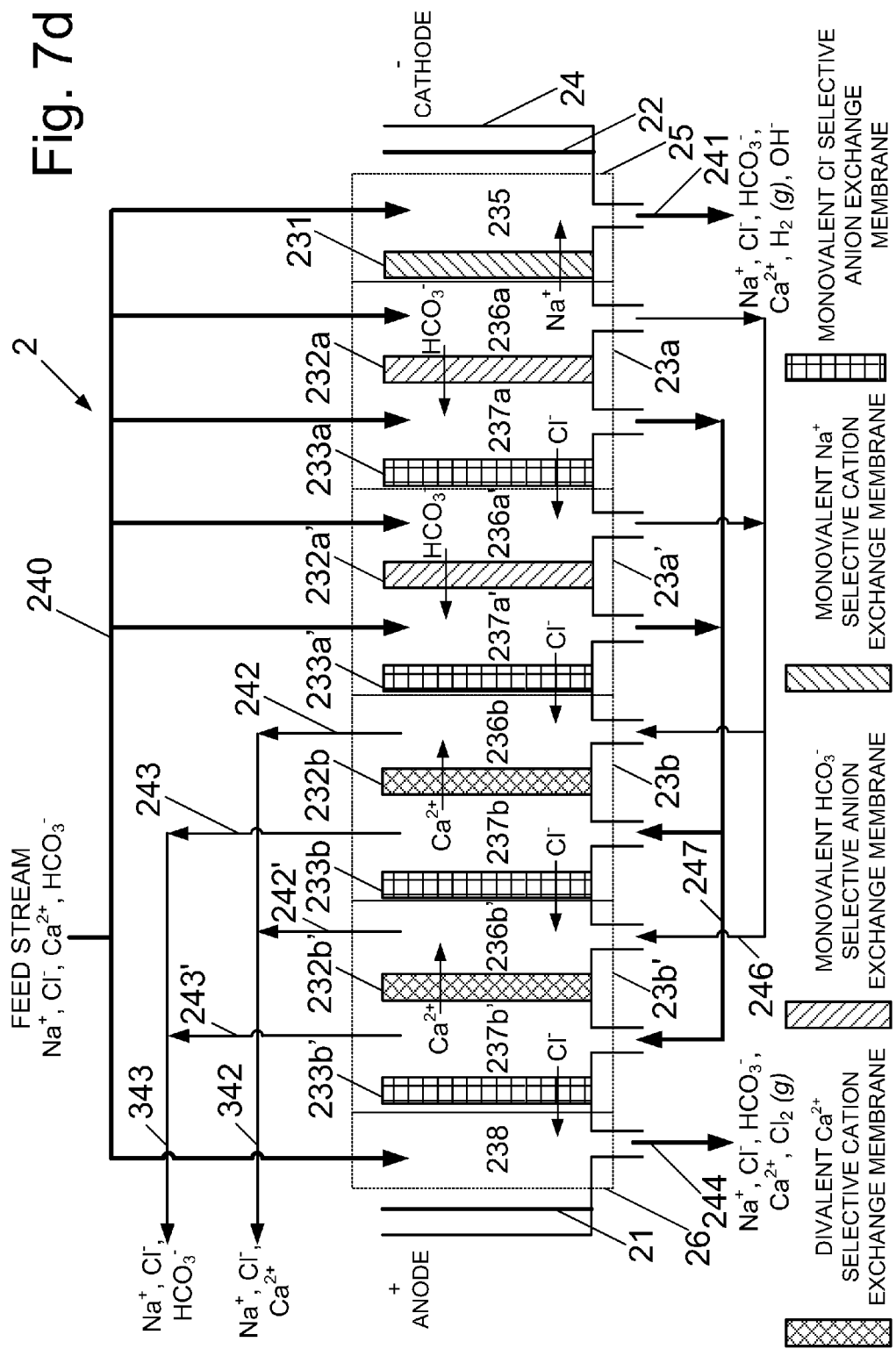

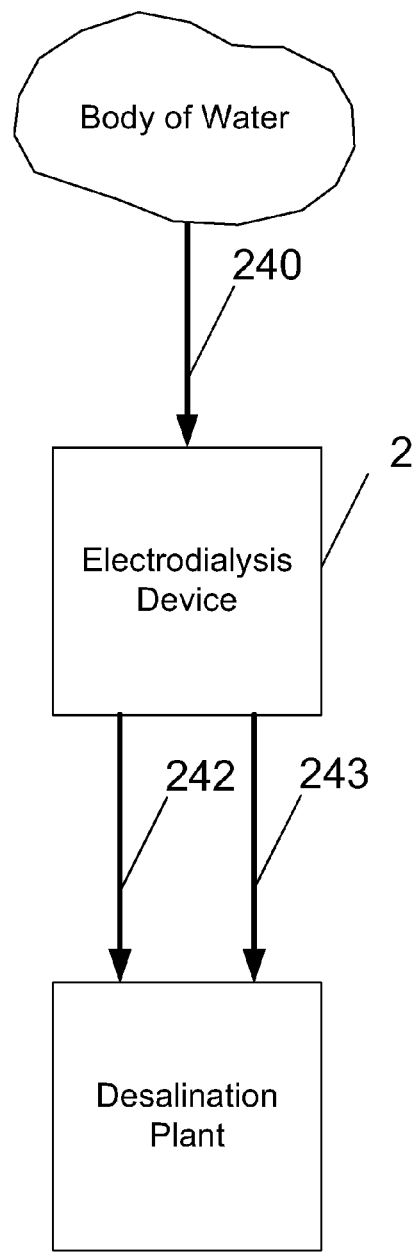
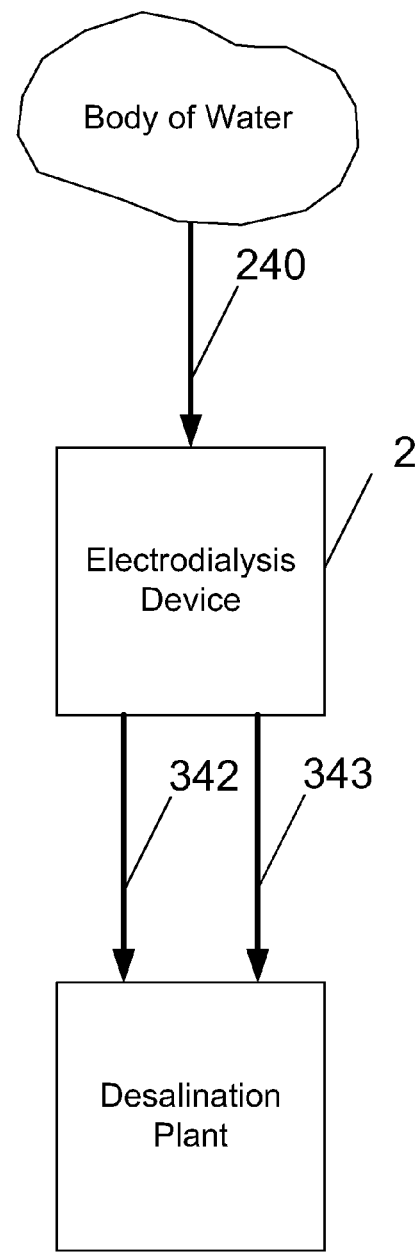
Fig. 8
Fig. 9

ELECTRODIALYSIS METHOD AND APPARATUS FOR PASSIVATING SCALING SPECIES

CROSS REFERENCE TO RELATED APPLICATION

This application is a divisional application of and claims the priority benefit of U.S. patent application Ser. No. 13/234,232 filed Sep. 16, 2011.

BACKGROUND OF THE INVENTION

Field of the Invention

This invention relates to the passivating of scaling species in water.

Description of Related Art

Water chemistry dominates and limits the design of desalination processes. Most separations are limited by precipitation of slightly soluble compounds such as $CaCO_3$ or $CaSO_4$ rather than by inherent physical characteristics such as osmotic pressure. For example, in desalination of inland brackish water sources, reverse osmosis is typically limited to around 75% water recovery by the presence of small amounts of scaling species such as $Ca^{2+}$, $SO_4^{2-}$, and $HCO_3^-$, while osmotic pressure alone would impose a much higher limit of 98% recovery if only $Na^+$ and $Cl^-$ were present. The consequences of low water recovery are 1) larger pumps, intakes, outfalls, and pretreatment systems, and 2) larger volumes of reject streams associated with lost water. The first consequence plays out most clearly in thermal desalination of seawater, where most processes run at only 25-35% water recovery and sub-optimum temperature due to scaling species. The second consequence seriously impacts the viability of inland desalination of brackish water.

Accordingly, a need exists for an effective solution to reduce the concentration of scaling species in the desalination process.

SUMMARY OF THE INVENTION

In one aspect of the invention an electrodialysis device comprises an inlet for directing a feed stream into a plurality of first feed paths and a plurality of second feed paths; the feed stream is comprised of a first anionic scaling species and a first cationic scaling species; the first cationic scaling species is transferred from the second feed paths to the first feed paths through a first membrane group, the first anionic scaling species is transferred from the first feed paths to the second feed paths through the first membrane group; wherein the concentration of the first anionic scaling species in effluent exiting the first feed paths is less than about 90% of the concentration of the first anionic scaling species in the feed stream at the inlet of the electrodialysis device.

In another aspect, the electrodialysis device further comprises an electrodialysis vessel; a pair of electrodes arranged in the electrodialysis vessel, the pair of electrodes respectively serving as an anode and a cathode; an anode cell unit adjacent the anode, a cathode cell unit adjacent the cathode, and at least one general cell unit arranged between the anode cell unit and the cathode cell unit; the cathode cell unit having a third membrane group comprised of one or more elements, and the general cell unit having a first membrane group comprised of one or more elements, a second membrane group comprised of one or more elements, a first feed path, and a second feed path; the first membrane group comprising an anion exchange membrane and a cation exchange membrane; the first feed path of one of the general cell units is defined by the first membrane group of the general cell unit and the third membrane group of an adjacent cathode cell unit; the first feed path of at least one of the general cell units is defined by the first membrane group of the general cell unit and the second membrane group of an adjacent general cell unit; the second feed path of the one or more general cell units is defined by the first and second membrane groups.

In another aspect of the electrodialysis device, the concentration of the first cationic scaling species in effluent exiting the second feed paths is less than about 90% of the concentration of first cationic scaling species in the feed stream at the inlet of the electrodialysis device.

In another aspect of the electrodialysis, the concentration of the first anionic scaling species in effluent exiting first feed paths is less than about 50% of the concentration of first anionic scaling species in the feed stream at the inlet of the electrodialysis device, wherein the concentration of the first cationic scaling species in effluent exiting the second feed paths is less than about 50% of the concentration of first cationic scaling species in the feed stream at the inlet of the electrodialysis device.

In another aspect of the electrodialysis device, the concentration of the first anionic scaling species in effluent exiting the first feed paths is less than about 20% of the concentration of first anionic scaling species in the feed stream at the inlet of the electrodialysis device, wherein the concentration of the first cationic scaling species in effluent exiting the second feed paths is less than about 20% of the concentration of first cationic scaling species in the feed stream at the inlet of the electrodialysis device.

In another aspect of the electrodialysis device, the first membrane group elements are selected from the group consisting of a monovalent selective anion exchange membrane, a monovalent selective cation exchange membrane, a divalent selective anion exchange membrane, or a divalent selective cation exchange membrane.

In another aspect of the electrodialysis device, the second membrane group is comprised of at least one anion exchange membrane element or at least one cation exchange membrane element.

In another aspect of the electrodialysis device, the third membrane group is comprised of at least one anion exchange membrane element or at least one cation exchange membrane element.

In another aspect of the electrodialysis device, the first cationic scaling species is selected from the group consisting of $Mg^{2+}$, $Ca^{2+}$, $Sr^{2+}$, and $Ba^{2+}$, and the first anionic scaling species is selected from the group consisting of $SO_4^{2-}$, $HCO_3^-$, $CO_3^{2-}$, $OH^-$, $F^-$, $PO_4^{3-}$, $HPO_4^{2-}$, and $H_2PO_4^-$.

In another aspect of the electrodialysis device, the first feed paths and the second feed paths are in flow communication with a desalination plant intake, the contents of the first feed paths and the second feed paths are processed separately in the desalination plant.

In another aspect, the electrodialysis device further comprises at least two electrodialysis vessels, each vessel comprising a pair of electrodes, the pair of electrodes respectively serving as an anode and a cathode; an anode cell unit adjacent the anode, a cathode cell unit adjacent the cathode, and at least one general cell unit arranged between the anode cell unit and the cathode cell unit; the anode cell unit, the cathode cell unit, and the at least one general cell unit spanning the electrodialysis vessels; the cathode cell unit having a third membrane group comprised of one or more elements, and the general cell unit having a first membrane group comprised of one or more elements, a second membrane group comprised of one or more elements, a first feed path, and a second feed path; the first membrane group comprising an anion exchange membrane and a cation exchange membrane; the first feed path of one of the general cell units is defined by the first membrane group of the general cell unit and the third membrane group of an adjacent cathode cell unit; the first feed path of at least one of the general cell units is defined by the first membrane group of the general cell unit and the second membrane group of an adjacent general cell unit; the second feed path of the one or more general cell units is defined by the first and second membrane groups.

In another aspect, the electrodialysis device of claim 1 further comprises one or more electrodialysis vessels having more than one hydraulic stage, each of the vessels comprising a pair of electrodes, the pair of electrodes respectively serving as an anode and a cathode; the cathode cell unit having a third membrane group comprised of one or more elements, and the general cell unit having a first membrane group comprised of one or more elements, a second membrane group comprised of one or more elements, a first feed path, and a second feed path; the general cell unit, the first and second membrane groups, and the first and second feed paths each have a first and second part; the first membrane group comprising an anion exchange membrane and a cation exchange membrane; the first feed path of the one or more general cell units is at least partially defined by the first membrane group; the second feed path of the one or more general cell units is at least partially defined by the first membrane group and the second membrane group.

In yet another aspect of the invention, a method for passivating scaling species comprises passing a direct current through a pair of electrodes in an electrodialysis device having a first feed path and a second feed path, so as to energize the pair of electrodes respectively as a cathode and an anode; supplying a feed stream comprised of a first anionic scaling species and a first cationic scaling species to the first feed path and the second feed path; the first feed path and the second feed path are separated by a first membrane group; and transferring the first cationic scaling species from the second feed path to the first feed path through the first membrane group.

In another aspect, the method further comprises transferring the first anionic scaling species from the first feed path to the second feed path through the first membrane group; wherein the electrolysis device further comprising one or more electrodialysis vessels, each of the electrodialysis vessels containing the anode and cathode; an anode cell unit is adjacent the anode, a cathode cell unit is adjacent the cathode, and at least one general cell unit is arranged between the anode cell unit and cathode cell unit; the cathode cell unit having a third membrane group comprised of one or more elements, and the general cell units having a first membrane group comprised of one or more elements, a second membrane group comprised of one or more elements, the first feed path, and the second feed path; the first membrane group comprising an anion exchange membrane and a cation exchange membrane; the first feed path of the one or more general cell units is at least partially defined by the first membrane group; the second feed path of the one or more general cell units is at least partially defined by the first and second membrane groups.

In another aspect, the method further comprises removing the effluent from the first and second feed paths; wherein the concentration of the first anionic scaling species in effluent removed from the first feed path is less than about 90% of the concentration of first anionic scaling species in the feed stream entering the first feed path.

In another aspect of the method, the second membrane groups are comprised of at least one anion exchange membrane or at least one cation exchange membrane.

In another aspect of the method, the third membrane groups are comprised of at least one anion exchange membrane or at least one cation exchange membrane.

In another aspect, the method further comprising directing the effluent from the first and second feed paths to a desalination plant, the contents of the first feed path are processed separately from the contents of the second feed path.

In another aspect of the method, the electrodialysis device is further comprised of two or more electrodialysis vessels, each of the electrodialysis vessels having an anode and cathode; the anode cell unit, the cathode cell unit, and the one or more general cell units span the two or more electrodialysis vessels.

In another aspect of the method, the first cationic scaling species is selected from the group consisting of $Mg^{2+}$, $Ca^{2+}$, $Sr^{2+}$, and $Ba^{2+}$, and the first anionic scaling species is selected from the group consisting of $SO_4^{2-}$, $HCO_3^-$, $CO_3^{2-}$, $OH^-$, $F^-$, $PO_4^{3-}$, $HPO_4^{2-}$, and $H_2PO_4^-$.

BRIEF DESCRIPTION OF DRAWINGS

These and other aspects of the invention will be understood from the description and claims herein, taken together with the drawings showing details of construction and illustrative embodiments, wherein:

FIG. 7c schematically illustrates the electrodialysis device according to a ninth embodiment of the invention.

FIG. 7d schematically illustrates the electrodialysis device according to a tenth embodiment of the invention.

FIG. 8 is a block diagram illustrating the use of the electrodialysis device according to an embodiment of the invention.

FIG. 9 is a block diagram illustrating the use of the electrodialysis device according to an embodiment of the invention.

DETAILED DESCRIPTION OF THE INVENTION

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

Figure 1:
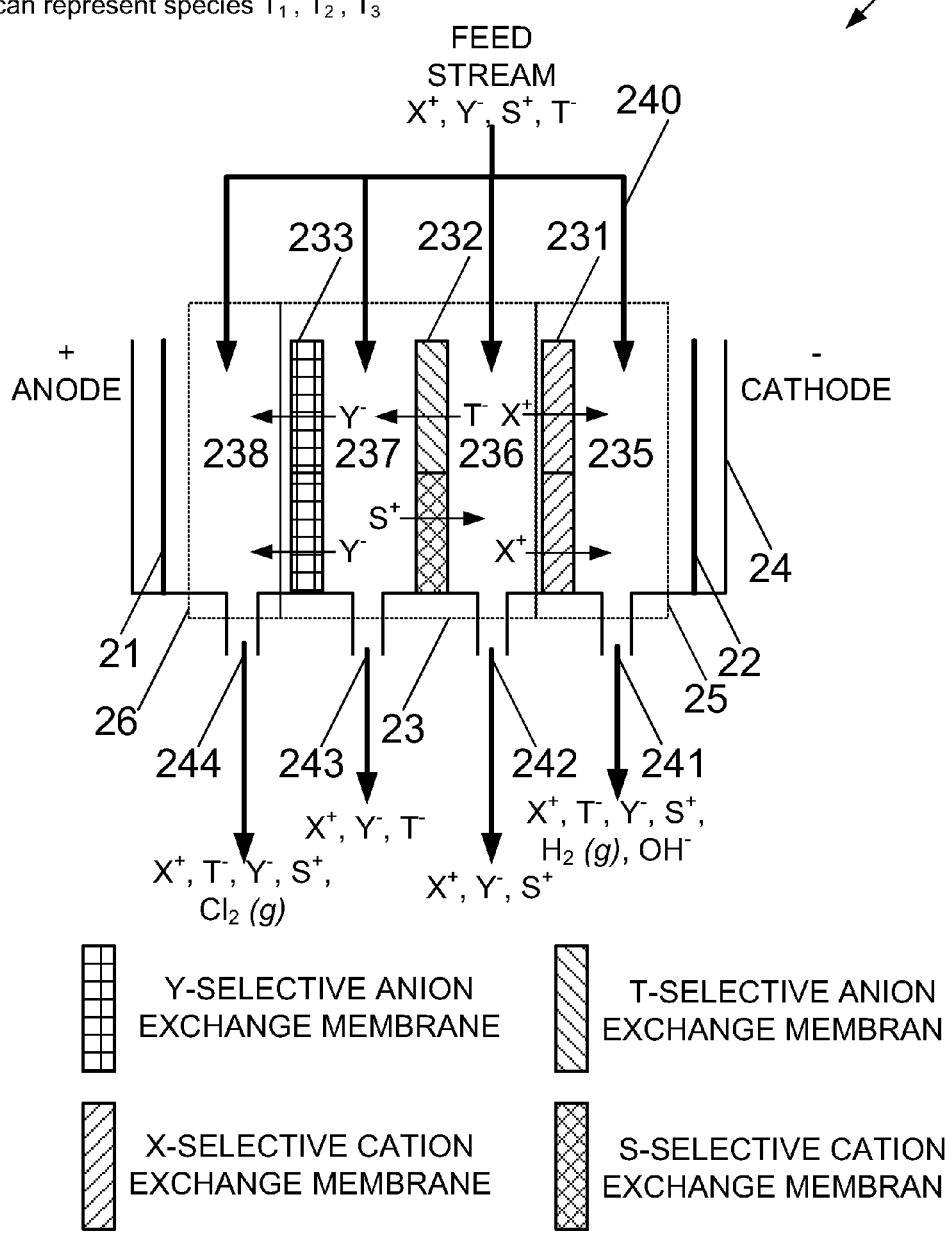
FIG. 1 schematically illustrates the electrodialysis device according to a first embodiment of the invention.

Referring to FIG. 1, a first embodiment of the electrodialysis device 2 for passivating scaling species, such as scaling species selected from the group consisting of $CaSO_4$, $CaCO_3$, $Mg(OH)_2$, $CaF_2$, $SrSO_4$, $BaSO_4$, and $Ca_3(PO_4)_2$, includes a pair of electrodes respectively acting as an anode 21 and a cathode 22, a cathode cell unit 25 adjacent the cathode 22, an anode cell unit 26 adjacent the anode 21, at least one general cell unit 23 between the anode cell unit 26 and cathode cell unit 25, and a vessel 24 for housing the anode 21, cathode 22, cathode cell unit 25, anode cell unit 26, and the at least one general cell unit 23 therein. The anode 21 and cathode 22 respectively connect to an anode and a cathode of a DC or pulsed power supply. A person having ordinary skill in the art understands that in some embodiments, cathode 22 has an optional cathode guard membrane and anode 21 has an optional anode guard membrane. The optional cathode and anode guard membranes form guard channels adjacent to the anode 21 and cathode 22. In one embodiment, the optional anode and cathode guard membranes are cation exchange membranes.

The vessel 24 includes at least one inlet 240 for inducing feed streams to flow through the electrodialysis device 2, and at least one first feed path outlet 242, at least one second feed path outlet 243, a third feed path outlet 241, and a fourth feed path outlet 244 respectively. The cathode cell unit 25 has a third feed path 235 and a third membrane group 231 comprised of one or more elements. The anode cell unit 26 is comprised of a fourth feed path 238. The general cell unit 23 is comprised of a first feed path 236, a second feed path 237, a first membrane group 232 comprised of one or more elements, and a second membrane group 233 comprised of one or more elements.

In the cathode cell unit 25, the third membrane group 231 is arranged between the cathode 22 and an adjacent general cell unit 23. The third membrane group 231 and cathode 22 define the third feed path 235 having a third feed path outlet 241. In the anode cell unit 26, the fourth feed path 238 having a fourth feed path outlet 244 is defined between an adjacent general cell unit 23 and the anode 21.

In the general cell unit 23, the second membrane group 233 is located on the anode side of general cell unit 23 and a first membrane group 232 is located on the cathode side of the general cell unit 23. The second membrane group 233 and first membrane group 232 define the second feed path 237 having a second feed path outlet 242. The first membrane group 232 and adjacent cell unit on the cathode side of general cell unit 23 define the first feed path 236 having a first feed path outlet 242. Therefore, when progressing from the anode side of the general cell unit 23 to the cathode side of general cell unit 23, the general cell unit 23 is comprised of a second membrane group 233, second feed path 237, first membrane group 232, and first feed path 236. In some embodiments of general cell unit 23, the adjacent cell unit on the cathode side of general cell unit 23 is cathode cell unit 25. In other embodiments, the adjacent cell unit on the cathode side of general cell unit 23 is another general cell unit 23.

In the embodiment shown in FIG. 1, a feed stream is provided to the inlet 240 of the electrodialysis device 2 containing $X^+$, $Y^-$, $S^+$, and $T^-$. $X^+$ and $Y^-$ represent non-scaling cations and anions, $S^+$ represents a first cationic scaling species, and $T^-$ represents a first anionic scaling species. The elements in the third membrane group 231 are X-selective anion exchange membranes. The elements in the second membrane group 233 are Y-selective anion exchange membranes. The first membrane group 232 is comprised of a T-selective anion exchange membrane element and a S-selective cation exchange membrane element. In FIG. 1, the T-selective anion exchange membrane is placed before the S-selective cation exchange membrane. However, the functionality will not change if the S-selective cation exchange membrane is placed before the T-selective anion exchange membrane. Accordingly, it is contemplated that in some embodiments, the T-selective anion exchange membrane is placed before the S-selective cation exchange membrane in the first membrane group 232.

When a direct current from the power supply flows through electrodialysis device 2 while the $S^+$ and $T^-$ cationic and anionic scaling species are flowing through the first feed path 236 and the second feed path 237, the first anionic scaling species ($T^-$) is transferred from the first feed path 236 to the second feed path 237 through the first membrane group 232, the first cationic scaling species ($S^+$) is transferred from the second feed path 237 to the first feed path 236 through the first membrane group 232. Further, the anionic non-scaling species $Y^-$ are transferred from the second feed path 237 to the fourth feed path 238 through the second membrane group 233. Lastly, the cationic non-scaling species $X^+$ are transferred from the first feed path 236 to the third feed path 235 through the third membrane group 231.

It is contemplated that the cationic scaling species can be selected from the group consisting of $Mg^{2+}$, $Ca^{2+}$, $Sr^{2+}$, and $Ba^{2+}$, and the anionic scaling species can be selected from the group consisting of $SO_4^{2-}$, $HCO_3^-$, $CO_3^{2-}$, $OH^-$, $F^-$, $PO_4^{3-}$, $HPO_4^{2-}$, and $H_2PO_4^-$.

In one embodiment, the concentration of first anionic scaling species in effluent exiting electrodialysis device 2 at the first feed path outlet 242 is less than about 90% of the concentration of first anionic scaling species in the feed stream 242 at the inlet of electrodialysis device 2. The concentration of first cationic scaling species in effluent exiting electrodialysis device 2 at the second feed path outlet 243 is less than about 90% of the concentration of first cationic scaling species in the feed stream 240 at the inlet of electrodialysis device 2.

In another embodiment, the concentration of first anionic scaling species in effluent exiting electrodialysis device 2 at the first feed path outlet 242 is less than about 50% of the concentration of first anionic scaling species in the feed stream at the inlet of electrodialysis device 2. The concentration of first cationic scaling species in effluent exiting electrodialysis device 2 at the second feed path outlet 243 is less than about 50% of the concentration of first cationic scaling species in the feed stream at the inlet of electrodialysis device 2.

In another embodiment, the concentration of first anionic scaling species in effluent exiting electrodialysis device 2 at the first feed path outlet 242 is less than about 20% of the concentration of first anionic scaling species in the feed stream at the inlet of electrodialysis device 2. The concentration of first cationic scaling species in effluent exiting electrodialysis device 2 at the second feed path outlet 243 is less than about 20% of the concentration of first cationic scaling species in the feed stream at the inlet of electrodialysis device 2.

Further, it is contemplated that electrodialysis device 2 may passivate two scaling species within a feed stream, such as is shown below in FIG. 5. Accordingly, in such embodiments, the concentration of second anionic scaling species in effluent exiting electrodialysis device 2 at the first feed path outlet 242 is less than about 90% of the concentration of second anionic scaling species in the feed stream 242 at the inlet of electrodialysis device 2. The concentration of second cationic scaling species in effluent exiting electrodialysis device 2 at the second feed path outlet 243 is less than about 90% of the concentration of second cationic scaling species in the feed stream 240 at the inlet of electrodialysis device 2.

In another embodiment in which electrodialysis device 2 passivates two scaling species within a feed stream, the concentration of second anionic scaling species in effluent exiting electrodialysis device 2 at the first feed path outlet 242 is less than about 50% of the concentration of second anionic scaling species in the feed stream at the inlet of electrodialysis device 2. The concentration of second cationic scaling species in effluent exiting electrodialysis device 2 at the second feed path outlet 243 is less than about 50% of the concentration of second cationic scaling species in the feed stream at the inlet of electrodialysis device 2.

In another embodiment in which electrodialysis device 2 passivates two scaling species within a feed stream, the concentration of second anionic scaling species in effluent exiting electrodialysis device 2 at the first feed path outlet 242 is less than about 20% of the concentration of second anionic scaling species in the feed stream at the inlet of electrodialysis device 2. The concentration of second cationic scaling species in effluent exiting electrodialysis device 2 at the second feed path outlet 243 is less than about 20% of the concentration of second cationic scaling species in the feed stream at the inlet of electrodialysis device 2.

Further, it is contemplated that in some embodiments, all or a portion of the effluent from the first feed path 236 may be fed back into the first feed paths 236 for additional processing until the concentration of an anionic scaling species of interest in the effluent is below a predetermined level. Additionally, it is contemplated that in some embodiments, all or a portion of the effluent from the second feed path 237 may be fed back into the second feed paths 237 for additional processing until the concentration of a cationic scaling species of interest in the effluent is below a predetermined level.

Additionally, it is contemplated that the effluent from the third and fourth feed paths 235 and 238 are returned to the feed stream 240 of electrodialysis device 2 or sent to a drain.

Since the first anionic scaling species ($T^-$) and first cationic scaling species ($S^+$) are located in separate feed path streams when they exit the electrodialysis device 2 in the form of effluent from the first feed path outlet 242 and second feed path outlet 243, the scaling species are passivated and no longer present a scaling risk. Accordingly, the effluent from the first feed path outlet 242 and second feed path outlet 243 can be provided to a desalination plant where the effluents can be processed separately to high recovery levels.

Figure 2:
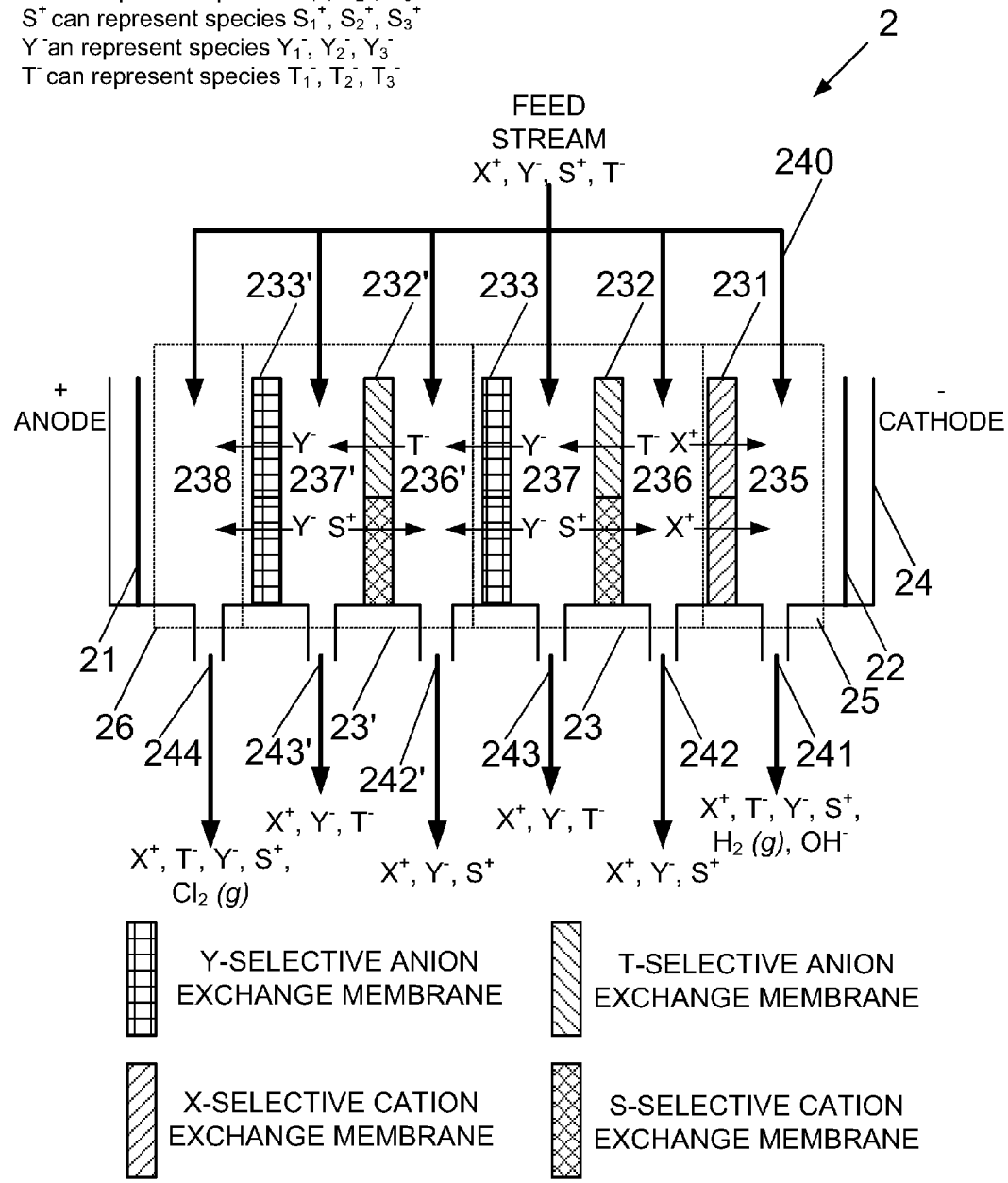
FIG. 2 schematically illustrates the electrodialysis device according to a second embodiment of the invention.

Referring to FIG. 2, in this embodiment, a feed stream is provided to the inlet 240 of electrodialysis device 2 containing $X^+$, $Y^-$, $S^+$, and $T^-$. $X^+$ and $Y^-$ represent non-scaling species, $S^+$ represents a first cationic scaling species and $T^-$ represents a first anionic scaling species. As can be seen, electrodialysis device 2 contains an anode cell unit 26, a cathode cell unit 25, a first general cell unit 23, and a second general cell unit 23'. While two general cell units 23 and 23' are shown in this embodiment, it is contemplated that other embodiment can contain more than two general cell units.

The elements in the second membrane groups 233 and 233' are Y-selective anion exchange membranes. The first membrane group 232 and 232' are comprised of a T-selective anion exchange membrane and an S-selective cation exchange membrane. The third membrane group 231 is comprised of X-selective cation exchange membranes.

When a direct current from the power supply flows through electrodialysis device 2 while the $S^+$ and $T^-$ scaling species are flowing through the first feed paths 236 and 236', and the second feed paths 237 and 237', the first anionic scaling species ($T^-$) is transferred from the first feed paths 236 and 236' to the second feed path 237 and 237' through the first membrane groups 232 and 232', the first cationic scaling species ($S^+$) is transferred from the second feed paths 237 and 237' to the first feed path 236 and 236' through the first membrane groups 232 and 232'. Further, the cationic non-scaling species $X^+$ is transferred from the first feed path 236 to the third feed path 235 through the third membrane group 231. Lastly, the anionic non-scaling species $Y^-$ is transferred from the second feed paths 237 and 237' to the first feed path 236' and fourth feed path 238.

Since the first anionic scaling species ($T^-$) and first cationic scaling species ($S^+$) are located in separate feed path streams when they exit the electrodialysis device 2 in the form of effluent from the first feed path outlets 242 and 242' and the second feed path outlets 243 and 243', the scaling species are no longer a scaling risk. Accordingly, in some embodiments, the effluent from the first feed path outlets 242 and 242', and second feed path outlet 243 and 243' can be provided to a desalination plant where the effluents can be processed separately to high recovery.

In other embodiments, the first feed path outlets (e.g. 242 and 242') can be merged into a combined first feed paths outlet, and the second feed path outlets (e.g. 243 and 243') can be merged into a combined second feed paths outlet. Accordingly, the effluent from the first and second combined feed paths outlets can be provided to a desalination plant where the effluents can be processed separately to high recovery.

Figure 3:
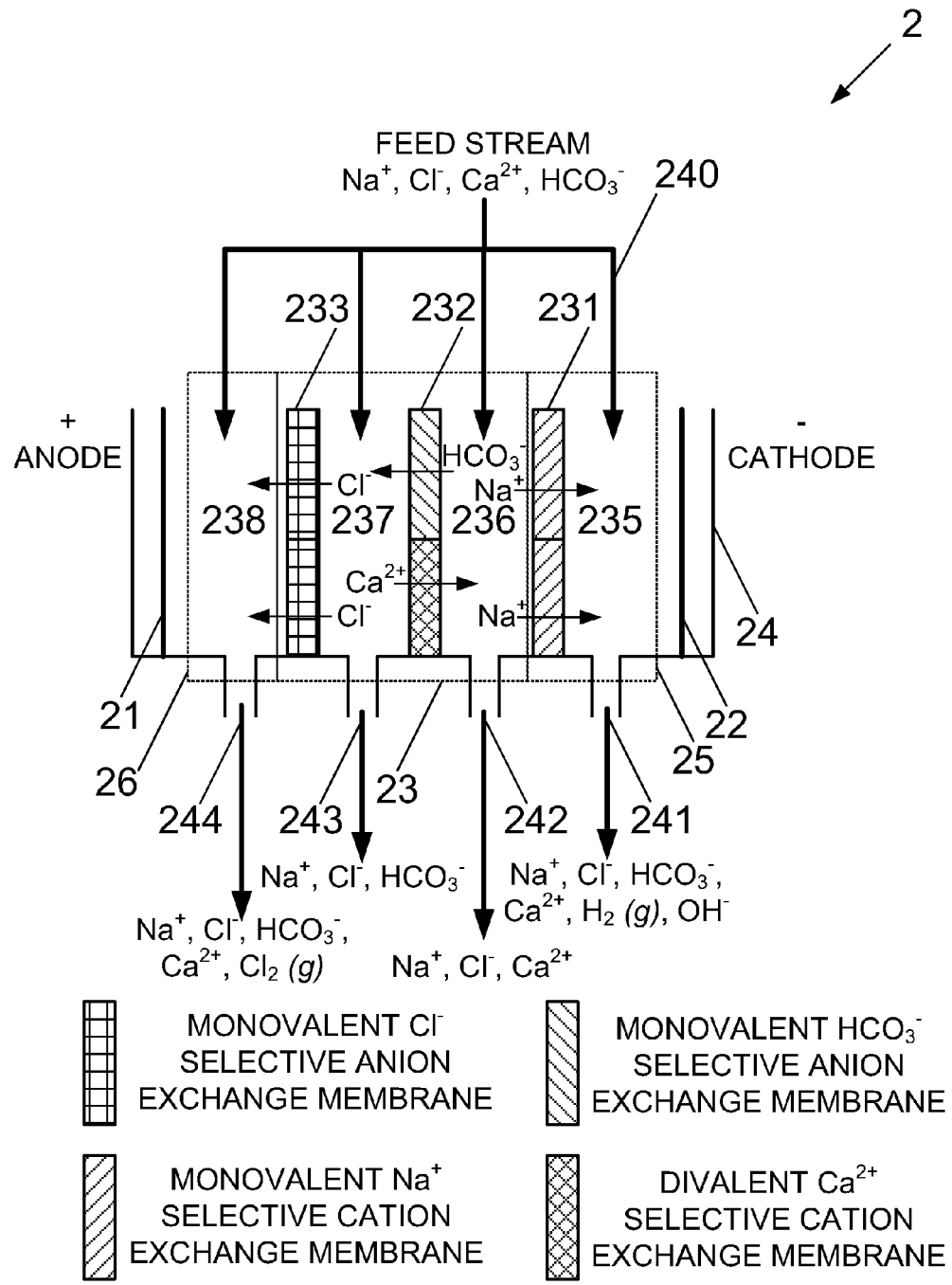
FIG. 3 schematically illustrates the electrodialysis device according to a third embodiment of the invention.

Referring to FIG. 3, in this embodiment, a feed stream is provided to the inlet 240 of electrodialysis device 2 containing $Na^+$, $Cl^-$, $Ca^{2+}$, and $HCO_3^-$. In this embodiment, $Ca^{2+}$ is the first cationic scaling species and $HCO_3^-$ is the first anionic scaling species. The elements in the second membrane group 233 are monovalent $Cl^-$ selective anion exchange membranes. The elements in the first membrane group 232 are monovalent $HCO_3^-$ selective anion exchange and divalent $Ca^{2+}$ selective cation exchange membranes. The third membrane group 231 is comprised of monovalent $Na^+$ selective anion exchange membranes.

When a direct current from the power supply flows through electrodialysis device 2 while the scaling species are flowing through the first feed path 236 and the second feed path 237, the first anionic scaling species ($HCO_3^-$) is transferred from the first feed path 236 to the second path 237 through the first membrane group 232, and the first cationic scaling species ($Ca^{2+}$) is transferred from the second feed path 237 to the first feed path 236 through the first membrane group 232. Further, anionic non-scaling species $Cl^-$ is transferred from the second flow path 237 to the fourth flow path 238 through the second membrane group 233, and the cationic non-scaling species $Na^+$ is transferred from the first feed path 236 to the third feed path 235 through the third membrane group 231.

Since the first anionic scaling species ($HCO_3^-$) and first cationic scaling species ($Ca^{2+}$) are located in separate feed path streams when they exit the electrodialysis device 2 in the form of effluent from the first feed path outlet 242 and second feed path outlet 243, the scaling species are no longer a scaling risk. Accordingly, the effluent from the first feed path outlet 242 and second feed path outlet 243 can be provided to a desalination plant where the effluents can be processed separately to high recovery.

Figure 4:
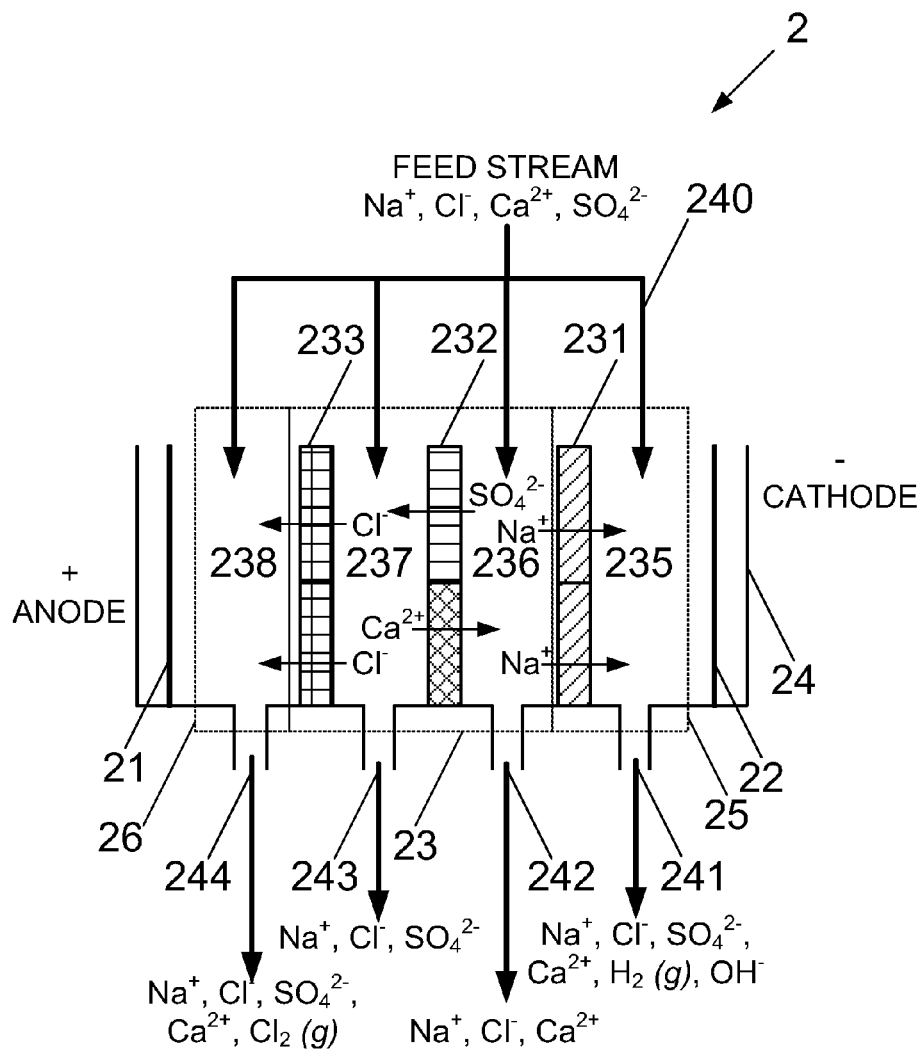
FIG. 4 schematically illustrates the electrodialysis device according to a fourth embodiment of the invention.

Referring to FIG. 4, in this embodiment, a feed stream is provided to the inlet 240 of electrodialysis device 2 containing $Na^+$, $Cl^-$, $Ca^{2+}$, and $SO_4^{2-}$. In this embodiment, $Ca^{2+}$ is the first cationic scaling species and $SO_4^{2-}$ is the first anionic scaling species. The elements comprising the second membrane group 233 are monovalent $Cl^-$ selective anion exchange membranes. The elements in the first membrane group 232 are divalent $SO_4^{2-}$ selective anion exchange and divalent $Ca^{2+}$ selective cation exchange membrane elements.

When a direct current from the power supply flows through electrodialysis device 2 while the scaling species are flowing through the first feed path 236 and the second feed path 237, the first anionic scaling species ($SO_4^{2-}$) is transferred from the first feed path 236 to the second feed path 237 through the first membrane group 232, the first cationic scaling species ($Ca^{2+}$) is transferred from the second feed path 237 to the first feed path 236 through the first membrane group 232. Further, anionic non-scaling species $Cl^-$ is transferred from the second feed path 237 to the fourth feed path 238 through the second membrane group 233, and the cationic non-scaling species $Na^+$ is transferred from the first feed path 236 to the third feed path 235 through the third membrane group 231.

Since the first anionic scaling species ($SO_4^{2-}$) and first cationic scaling species ($Ca^{2+}$) are located in separate feed path streams when they exit the electrodialysis device 2 in the form of effluent from the first feed path outlet 242 and second feed path outlet 243, the scaling species are no longer a scaling risk. Accordingly, the effluent from the first feed path outlet 242 and second feed path outlet 243 can be provided to a desalination plant where the effluents can be processed separately to high recovery.

Figure 5:
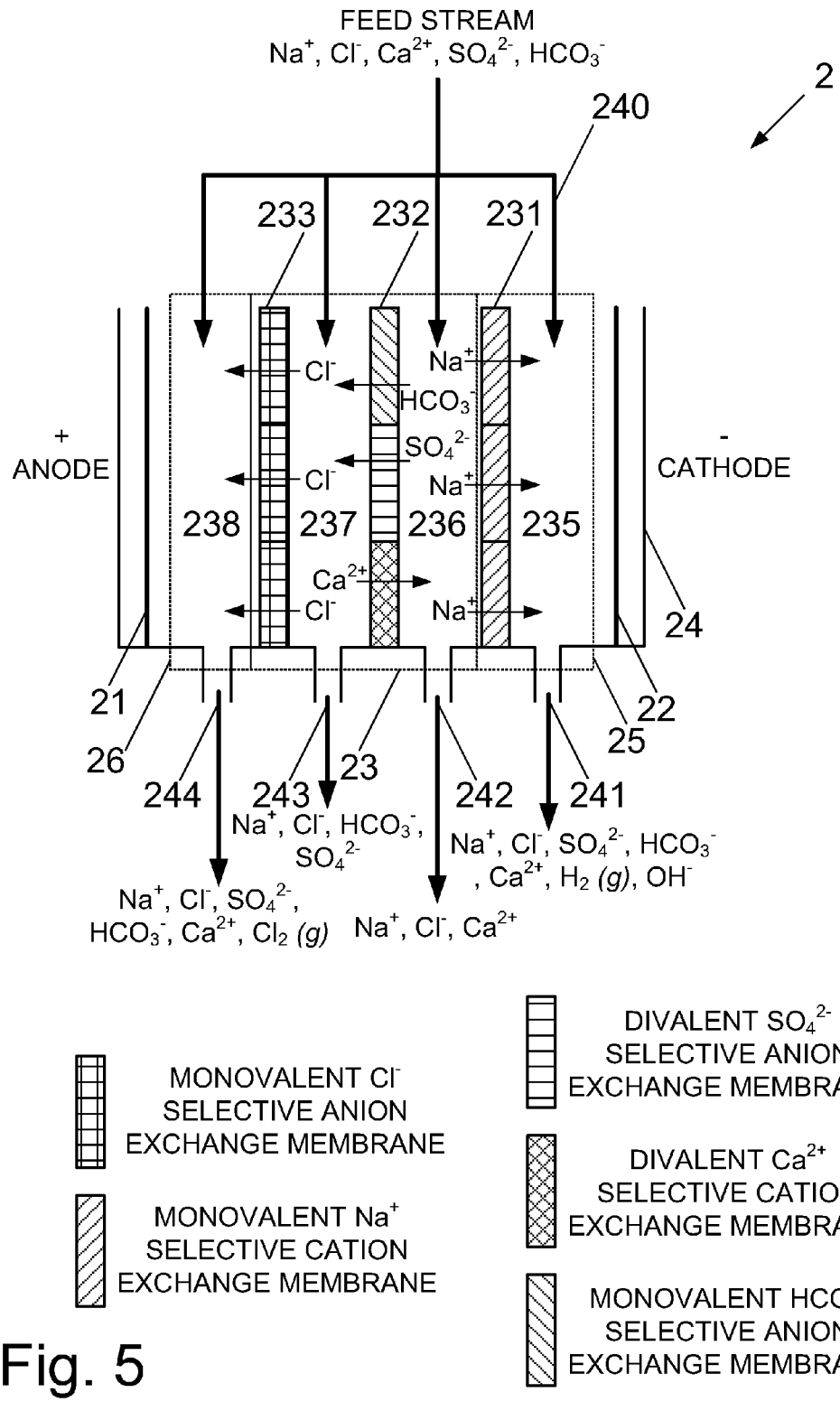
FIG. 5 schematically illustrates the electrodialysis device according to a fifth embodiment of the invention.

Referring to FIG. 5, in this embodiment, a feed stream is provided to the inlet 240 of electrodialysis device 2 containing $Na^+$, $Cl^-$, $Ca^{2+}$, $HCO_3^-$, and $SO_4^{2-}$. In this embodiment, $Ca^{2+}$ is the first cationic scaling species and $SO_4^{2-}$ is the first anionic scaling species. Further, $Ca^{2+}$ is the second cationic scaling species and $HCO_3^-$ is the second anionic scaling species. The elements in second membrane group 233 are monovalent $Cl^-$ selective anion exchange membranes. The elements in the first membrane group 232 are monovalent $HCO_3^-$ selective anion exchange, divalent $SO_4^{2-}$ selective anion exchange, and divalent $Ca^{2+}$ selective cation exchange membranes. The elements in the third membrane group 231 are monovalent $Na^+$ selective cation exchange membranes.

When a direct current from the power supply flows through electrodialysis device 2 while the scaling species are flowing through the first feed path 236 and the second feed path 237, the first anionic scaling species ($SO_4^{2-}$) and second anionic scaling species ($HCO_3^-$) are transferred from the first feed path 236 to the second feed path 237 through the first membrane group 232, the first and second cationic scaling species ($Ca^{2+}$) are transferred from the second feed path 237 to the first feed path 236 through the first membrane group 232. Further, anionic non-scaling species $Cl^-$ is transferred from the second feed path 237 to the fourth feed path 238 through the second membrane group 233. Also, the cationic non-scaling species $Na^+$ is transferred from the first feed path 236 to the third feed path through the third membrane group 231.

Since the first anionic scaling species ($SO_4^{2-}$) and second anionic scaling species ($HCO_3^-$), and the first and second cationic scaling species ($Ca^{2+}$) are located in separate feed path streams when they exit the electrodialysis device 2 in the form of effluent from the first feed path outlet 242 and second feed path outlet 243, the scaling species are no longer a scaling risk. Accordingly, the effluent from the first feed path outlet 242 and second feed path outlet 243 can be provided to a desalination plant where the effluents can be processed separately to high recovery.

Accordingly, it is contemplated that in other embodiments, the cationic scaling species can be selected from the group consisting of $Mg^{2+}$, $Ca^{2+}$, $Sr^{2+}$, and $Ba^{2+}$, and the anionic scaling species can be selected from the group consisting of $SO_4^{2-}$, $HCO_3^-$, $CO_3^{2-}$, $OH^-$, $F^-$, $PO_4^{3-}$, $HPO_4^{2-}$, and $H_2PO_4^-$.

Figure 6:
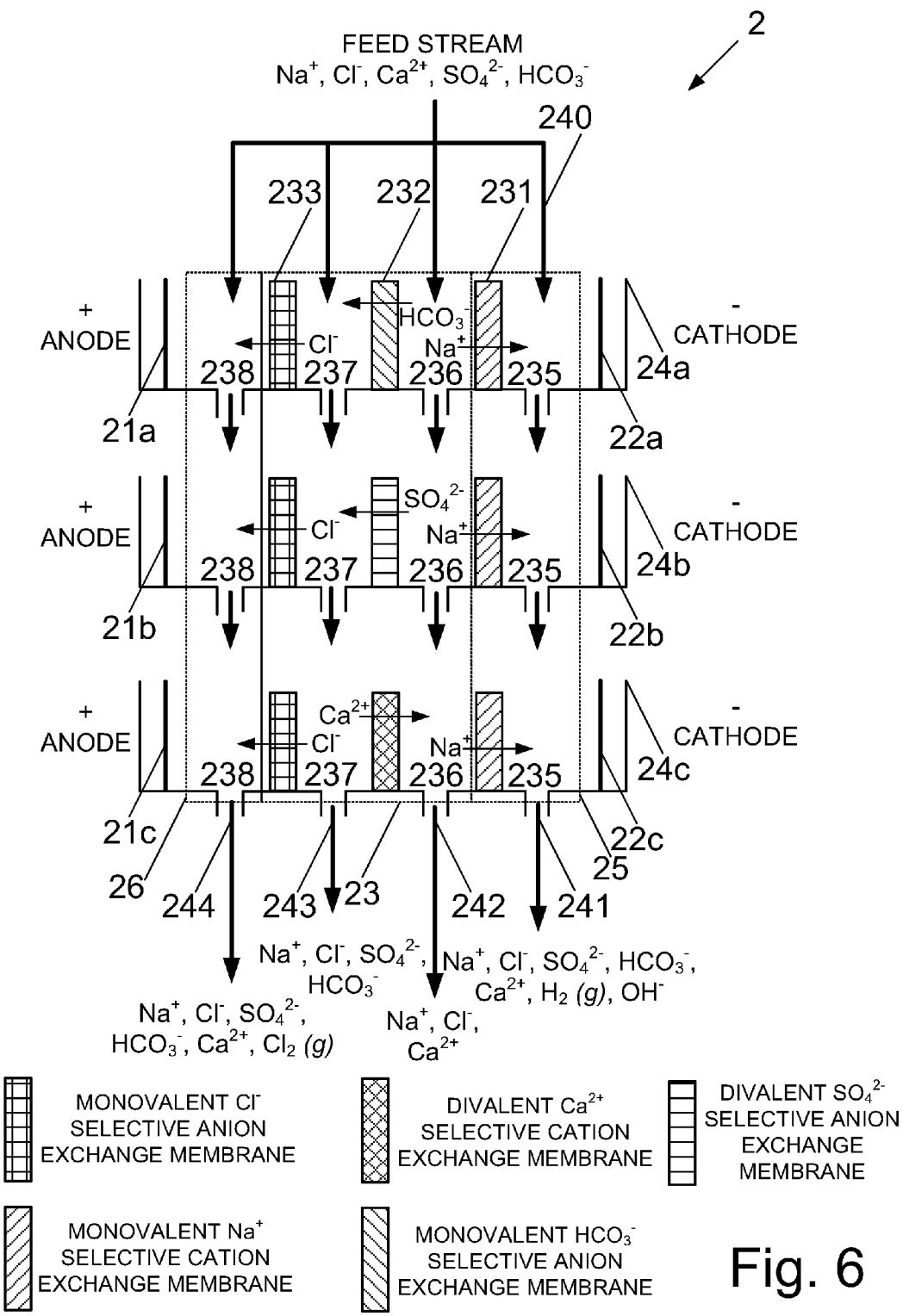
FIG. 6 schematically illustrates the electrodialysis device according to a sixth embodiment of the invention.

Referring to FIG. 6, it is contemplated that some embodiments of electrodialysis device 2 may have multiple electrodialysis vessels, or electrical stages, 24a, 24b, and 24c connected in series. In such embodiments, the one or more general cell units 23, anode cell unit 26, cathode cell unit 25, the elements of the first, second, and third membrane groups 232, 231, and 233, and the first, second, third, and fourth feed paths 236, 237, 235, and 238 are divided between electrical stages 24a, 24b, and 24c. Each electrical stage 24a, 24b, and 24c has an anode 21a, 21b, and 21c, and a cathode 22a, 22b, and 22c.

In this embodiment, three electrical stages are shown, but it is contemplated that a person having ordinary skill in the art can choose to use a different number of electrical stages, such as two or more. Further, in this embodiment, each electrical stage is shown as having only one membrane element of each membrane group. However, a person having ordinary skill in the art can choose to use a different number of membrane elements in each electrical stage.

Referring to FIGS. 7a-d, it is contemplated that some embodiments of electrodialysis device 2 may have multiple hydraulic stages. Accordingly, in such embodiments, the one or more general cell units 23 span multiple hydraulic stages. Therefore, the elements of the first and second membrane groups 232 and 233, and the first and second feed paths 236 and 237 also span multiple hydraulic stages.

Figure 7A:
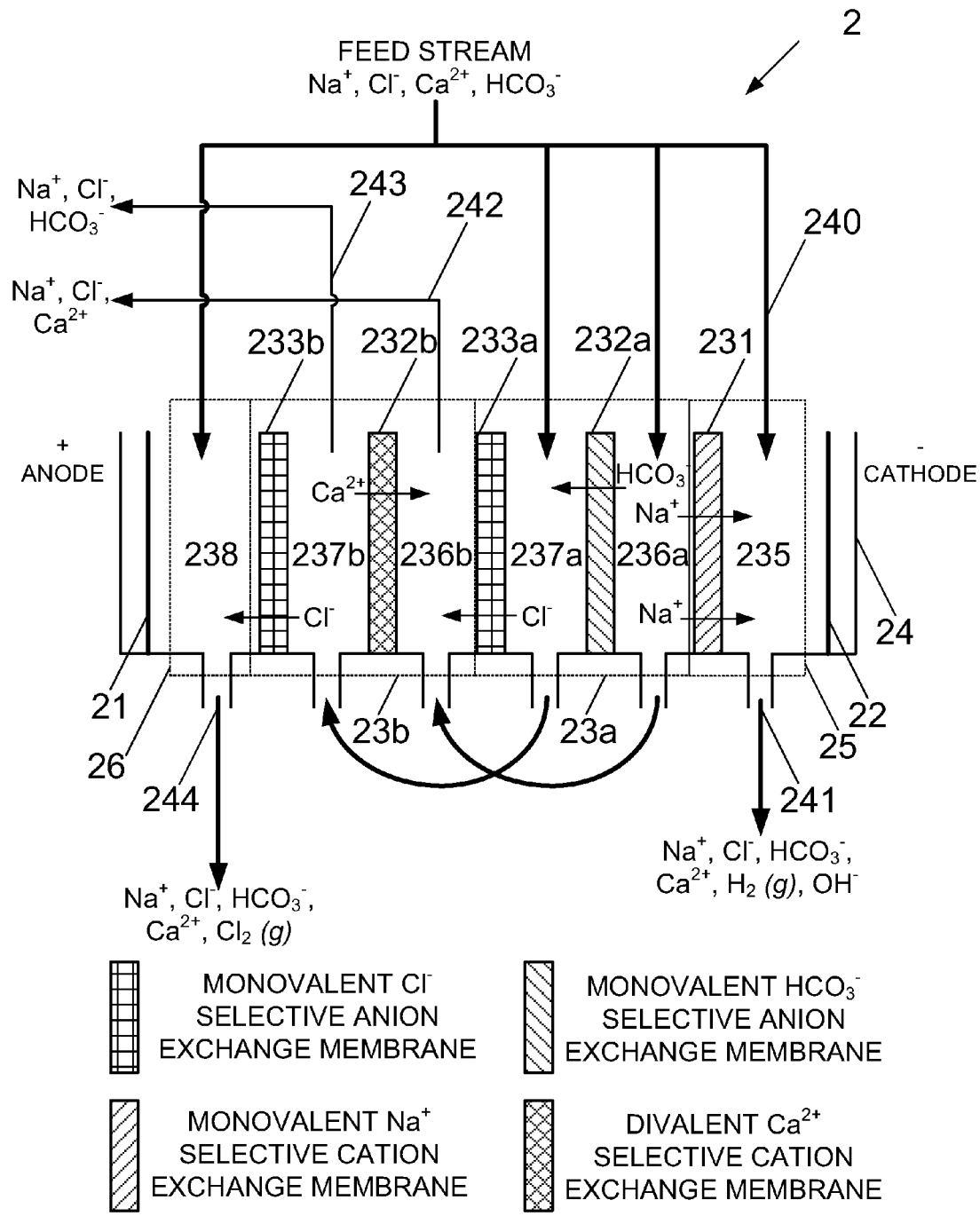
FIG. 7a schematically illustrates the electrodialysis device according to a seventh embodiment of the invention.

In the embodiment shown in FIG. 7a, general cell unit 23 is divided into a first stage hydraulic stage 23a and a second hydraulic stage 23b; the first feed path 236 is divided up into a first part 236a and a second part 236b; the second feed path 237 is divided up into a first part 237a and a second part 237b; the first membrane group 232 is divided up into a first part 232a and a second part 232b; and the second membrane group 233 is divided up into a first part 233a and a second part 233b. The first hydraulic stage of the general cell unit 23a contains the first part of the first feed path 236a, the first part of the second feed path 237a, the first part of the first membrane group 232a, and the first part of the second membrane group 233a. The second hydraulic stage of the general cell unit 23b contains the second part of the first feed path 236b, the second part of the second feed path 237b, the second part of the first membrane group 232b, and the second part of the second membrane group 233b.

The first part of first feed path 236a is defined by the third membrane group 231 of the cathode unit cell 25 and the first part of the first membrane group 232a, and the second part of the first feed path 236b is defined by the first part of the second membrane group 233a and the second part of the first membrane group 232b. The first part of the second feed path 237a is defined by the first part of the first membrane group 232a and the first part of the second membrane group 233a, and the second part of the second feed path 237b is defined by the second part of the first membrane group 232b and the second part of the second membrane group 233b.

Accordingly, in the general cell unit, the first feed path 236 is at least partially defined by the first membrane group 232, second membrane group 232, and the third membrane group 231 of the cathode cell unit 25. Further, the second feed path 237 is at least partially defined by the first membrane group 232 and second membrane group 233.

In the cathode cell unit 25, the third feed path 235 is defined by the third membrane group 213 and the cathode 22. In the anode cell unit 26, the fourth feed path 238 is defined by the at least part of the second membrane group 233 and the anode 21.

In this embodiment, a feed stream is provided to the inlet 240 of electrodialysis device 2 containing $Na^+$, $Cl^-$, $Ca^{2+}$, and $HCO_3^-$. In this embodiment, $Ca^{2+}$ is the first cationic scaling species and $HCO_3^-$ is the first anionic scaling species. The elements in the second membrane group 233 are monovalent $Cl^-$ selective anion exchange membranes. The elements in the first membrane group 232 are monovalent $HCO_3^-$ selective anion exchange and divalent $Ca^{2+}$ selective cation exchange membranes. The third membrane group 231 is comprised of monovalent $Na^+$ selective anion exchange membranes.

When a direct current from the power supply flows through electrodialysis device 2 while the scaling species are flowing through the first feed path 236 and the second feed path 237, the first anionic scaling species ($HCO_3^-$) is transferred from the first feed path 236 to the second path 237 through the first membrane group 232, and the first cationic scaling species ($Ca^{2+}$) is transferred from the second feed path 237 to the first feed path 236 through the first membrane group 232. Further, anionic non-scaling species $Cl^-$ is transferred from the second flow path 237 to the fourth flow path 238 through the second membrane group 233, anionic non-scaling species $Cl^-$ is transferred from the second flow path 237 to the first flow path 233 through the second membrane group 233, and the cationic non-scaling species $Na^+$ is transferred from the first feed path 236 to the third feed path 235 through the third membrane group 231.

Since the first anionic scaling species ($HCO_3^-$) and first cationic scaling species ($Ca^{2+}$) are located in separate feed path streams when they exit the electrodialysis device 2 in the form of effluent from the first feed path outlet 242 and second feed path outlet 243, the scaling species are no longer a scaling risk. Accordingly, the effluent from the first feed path outlet 242 and second feed path outlet 243 can be provided to a desalination plant where the effluents can be processed separately to high recovery.

Figure 7B:
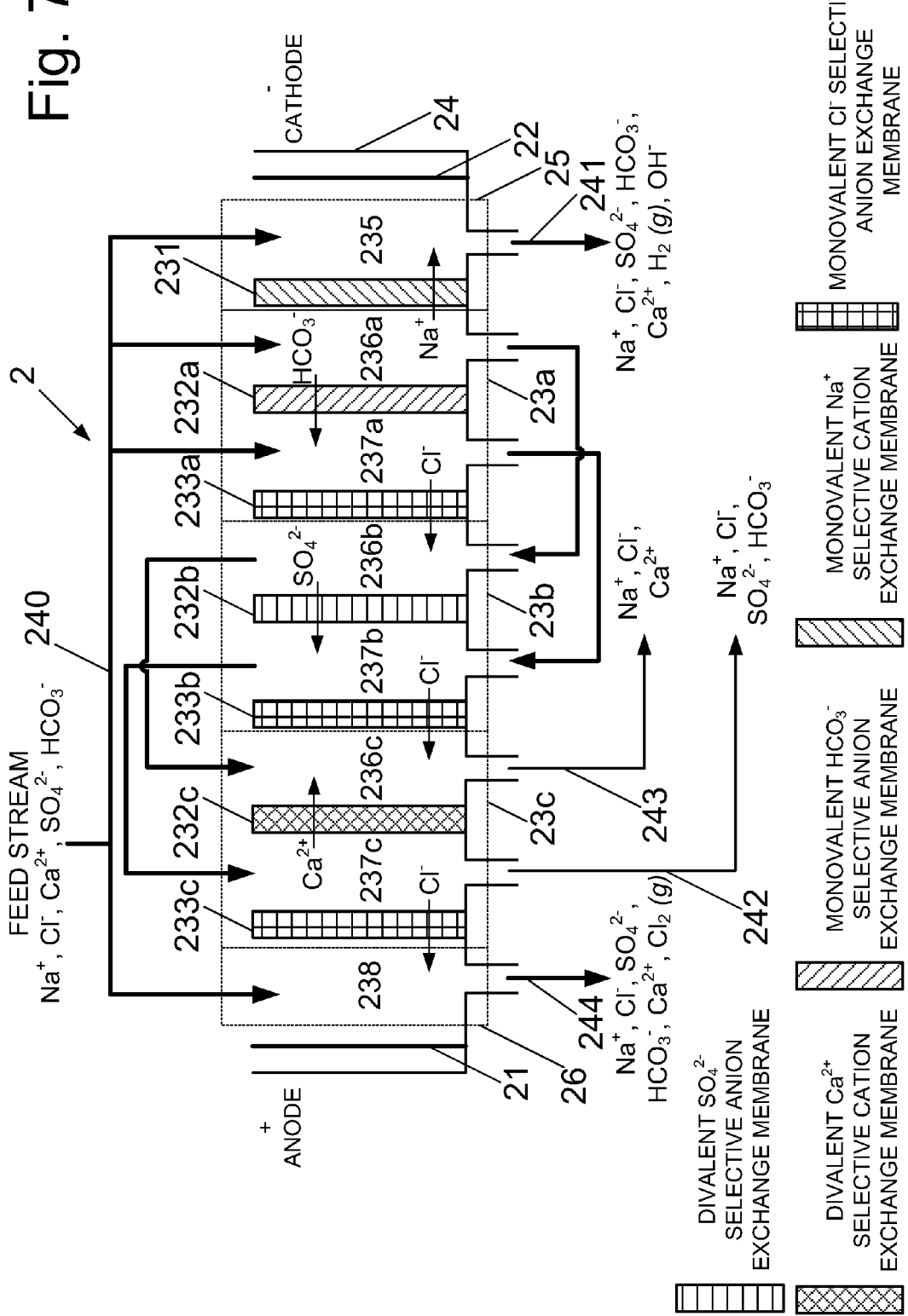
FIG. 7b schematically illustrates the electrodialysis device according to an eighth embodiment of the invention.

In the embodiment shown in FIG. 7b, general cell unit 23 is divided into a first stage hydraulic stage 23a, a second hydraulic stage 23b, and a third hydraulic stage 23c. The first hydraulic stage of the general cell unit 23a is located between the cathode cell unit 25 and second hydraulic stage of the general cell unit 23b. The third hydraulic stage of the general cell unit 23c is located between the anode cell unit 26 and the second hydraulic stage of the general cell unit 23b.

The first feed path 236 is divided up into a first part 236a, a second part 236b, and a third part 236c; the second feed path 237 is divided up into a first part 237a, a second part 237b, and a third part 237c; the first membrane group 232 is divided up into a first part 232a, a second part 232b, and a third part 232c; and the second membrane group 233 is divided up into a first part 233a, a second part 233b, and a third part 233c.

The first hydraulic stage of the general cell unit 23a contains the first part of the first feed path 236a, the first part of the second feed path 237a, the first part of the first membrane group 232a, and the first part of the second membrane group 233a. The second hydraulic stage of the general cell unit 23b contains the second part of the first feed path 236b, the second part of the second feed path 237b, the second part of the first membrane group 232b, and the second part of the second membrane group 233b. The third hydraulic stage of the general cell unit 23c contains the third part of the first feed path 236c, the third part of the second feed path 237c, the third part of the first membrane group 232c, and the third part of the second membrane group 233c.

The first part of the first feed path 236a is defined by the third membrane group 231 of the cathode unit cell 25 and the first part of the first membrane group 232a, the second part of the first feed path 236b is defined by the first part of the second membrane group 233a and the second part of the first membrane group 232b, and the third part of the first feed path 236c is defined by the second part of the second membrane group 233b and the third part of the first membrane group 232c. The first part of the second feed path 237a is defined by the first part of the first membrane group 232a and the first part of the second membrane group 233a, the second part of the second feed path 237b is defined by the second part of the first membrane group 232b and the second part of the second membrane group 233b, the third part of the second feed path 237c is defined by the third part of the first membrane group 232c and the third part of the second membrane group 233c.

Accordingly, in the general cell unit, the first feed path 236 is at least partially defined by the first membrane group 232, second membrane group 232, and the third membrane group 231 of the cathode cell unit 25. Further, the second feed path 237 is at least partially defined by the first membrane group 232 and second membrane group 233.

In the cathode cell unit 25, the third feed path 235 is defined by the third membrane group 213 and the cathode 22. In the anode cell unit 26, the fourth feed path 238 is defined by the at least part of the second membrane group 233 and the anode 21.

In this embodiment, a feed stream is provided to the inlet 240 of electrodialysis device 2 containing $Na^+$, $Cl^-$, $Ca^{2+}$, $HCO_3^-$, and $SO_4^{2-}$. In this embodiment, $Ca^{2+}$ is the first cationic scaling species and $SO_4^{2-}$ is the first anionic scaling species. Further, $Ca^{2+}$ is the second cationic scaling species and $HCO_3^-$ is the second anionic scaling species. The elements in second membrane group 233 are monovalent $Cl^-$ selective anion exchange membranes. The elements in the first membrane group 232 are monovalent $HCO_3^-$ selective anion exchange, divalent $SO_4^{2-}$ selective anion exchange, and divalent $Ca^{2+}$ selective cation exchange membranes. The elements in the third membrane group 231 are monovalent $Na^+$ selective cation exchange membranes.

When a direct current from the power supply flows through electrodialysis device 2 while the scaling species are flowing through the first feed path 236 and the second feed path 237, the first anionic scaling species ($SO_4^{2-}$) and second anionic scaling species ($HCO_3^-$) are transferred from the first feed path 236 to the second feed path 237 through the first membrane group 232, the first and second cationic scaling species ($Ca^{2+}$) are transferred from the second feed path 237 to the first feed path 236 through the first membrane group 232. Further, anionic non-scaling species $Cl^-$ is transferred from the second feed path 237 to the second and fourth feed paths 237 and 238 through the second membrane group 233. Also, the cationic non-scaling species $Na^+$ is transferred from the first feed path 236 to the third feed path through the third membrane group 231.

Since the first anionic scaling species ($SO_4^{2-}$) and second anionic scaling species ($HCO_3^-$), and the first and second cationic scaling species ($Ca^{2+}$) are located in separate feed path streams when they exit the electrodialysis device 2 in the form of effluent from the first feed path outlet 242 and second feed path outlet 243, the scaling species are no longer a scaling risk. Accordingly, the effluent from the first feed path outlet 242 and second feed path outlet 243 can be provided to a desalination plant where the effluents can be processed separately to high recovery.

Further, as is shown in FIGS. 7c and 7d, it is contemplated that some embodiments can have two or more general cell units 23. In the embodiments shown in FIGS. 7c and 7d, in the first general cell unit 23 is divided into a first hydraulic stage 23a and a second hydraulic stage 23b. In the first general cell unit 23, first feed path 236 is divided up into a first part 236a and a second part 236b; the second feed path 237 is divided up into a first part 237a and a second part 237b; the first membrane group 232 is divided up into a first part 232a and a second part 232b; and the second membrane group 233 is divided up into a first part 233a and a second part 233b.

The first hydraulic stage of the first general cell unit 23a contains the first part of the first feed path 236a, the first part of the second feed path 237a, the first part of the first membrane group 232a, and the first part of the second membrane group 233a. The second hydraulic stage of the first general cell unit 23b contains the second part of the first feed path 236b, the second part of the second feed path 237b, the second part of the first membrane group 232b, and the second part of the second membrane group 233b.

The second general cell unit 23' is divided into a first hydraulic stage 23a' and a second hydraulic stage 23b'. In the second general cell unit 23', first feed path 236' is divided up into a first part 236a' and a second part 236b'; the second feed path 237' is divided up into a first part 237a' and a second part 237b'; the first membrane group 232' is divided up into a first part 232a' and a second part 232b'; and the second membrane group 233' is divided up into a first part 233a' and a second part 233b'.

The first hydraulic stage of the second general cell unit 23a' contains the first part of the first feed path 236a', the first part of the second feed path 237a', the first part of the first membrane group 232a', and the first part of the second membrane group 233a'. The second hydraulic stage of the second general cell unit 23b' contains the second part of the first feed path 236b', the second part of the second feed path 237b', the second part of the first membrane group 232b', and the second part of the second membrane group 233b'.

In the first general cell unit 23, the first part of first feed path 236a is defined by the third membrane group 231 of the cathode unit cell 25 and the first part of the first membrane group 232a situated in the first hydraulic stage of the first general cell unit 23a, and the second part of the first feed path 236b is defined by the second part of the first membrane group 232b situated in the second hydraulic stage of the first general cell unit 23b and the first part of the second membrane group 233a' situated in the first stage of the second general cell unit 23b. The first part of the second feed path 237a is defined by the first part of the first membrane group 232a situated in the first hydraulic stage of the of the first general cell unit 23a and the first part of the second membrane group 233a situated in the first hydraulic stage of the first general cell unit 23a, and the second part of the second feed path 237b is defined by the second part of the first membrane group 232b situated in the second hydraulic stage of the first general cell unit 23b and the second part of the second membrane group 233b situated in the second hydraulic stage of the first general cell unit 23b.

Accordingly, in the first general cell unit 23, the first feed path 236 is at least partially defined by one or more elements of the first membrane group 232 of the first general cell unit 23, the second membrane group 233' of the second general cell unit 23', and the third membrane group 231 of the cathode cell unit 25. Further, the second feed path 237 is at least partially defined by one or more elements of the first membrane group 232 and second membrane group 233 of the first general cell unit 23.

In this embodiment, only the first and second general cell units 23 and 23' are present. However, it is contemplated that in embodiments having a larger number of general cell units (e.g. seven), the first feed path of the first general cell unit would be at least partially defined by one or more elements of the first membrane group of the first general cell unit, the second membrane group of the highest order general cell unit (e.g. seventh), and the third membrane group of the cathode cell unit.

Turning to the second general cell unit 23', the first part of first feed path 236a' is defined by the first part of the second membrane group 233a situated in the first hydraulic stage of the first general cell unit 23a and the first part of the first membrane group 232a' situated in the first hydraulic stage of the second general cell unit 23a'. The second part of the first feed path 236b' is defined by the second part of the second membrane group 233b situated in the second hydraulic stage of the first general cell unit 23b and the second part of the first membrane group 232b' situated in the second hydraulic stage of the second general cell unit 23b'. The first part of the second feed path 237a' is defined by the first part of the first membrane group 232a' situated in the first hydraulic stage of the second general cell unit 23a' and the first part of the second membrane group 233a' situated in the first hydraulic stage of the second general cell unit 23a'. The second part of the second feed path 237$b'$ is defined by the second part of the first membrane group 232$b'$ situated in the second hydraulic stage of the second general cell unit 23$b'$ and the second part of the second membrane group 233$b'$ situated in the second hydraulic stage of the second general cell unit 23$b'$.

Accordingly, in the second general cell unit 23', the first feed path 236' is at least partially defined by one or more elements of the first membrane group 232' of the second general cell unit 23' and the second membrane group 233 of the first general cell unit 23. Further, the second feed path 237' is at least partially defined by one or more elements of the first membrane group 232' and second membrane group 233' of the second general cell unit 23'.

In the cathode cell unit 25, the third feed path 235 is defined by the third membrane group 231 and the cathode 22. In the anode cell unit 26, the fourth feed path 238 is defined by the second membrane group 233' of the second general cell unit 23' and the anode 21. In embodiments having more than two general cell units, the fourth feed path 238 is defined by at least part of the second membrane group of the highest order general cell unit and the anode 21.

In this embodiment, a feed stream is provided to the inlet 240 of electrodialysis device 2 containing $Na^+$, $Cl^-$, $Ca^{2+}$, and $HCO_3^-$. In this embodiment, $Ca^{2+}$ is the first cationic scaling species and $HCO_3^-$ is the first anionic scaling species. The elements in the second membrane groups 233 and 233' are monovalent $Cl^-$ selective anion exchange membranes. The elements in the first membrane groups 232 and 232' are of monovalent $HCO_3^-$ selective anion exchange and divalent Ca' selective cation exchange membranes. The third membrane group 231 is comprised of monovalent $Na^+$ selective anion exchange membranes.

When a direct current from the power supply flows through electrodialysis device 2 while the scaling species are flowing through the first feed paths 236 and 236' and the second feed paths 237 and 237', the first anionic scaling species ($HCO_3^-$) is transferred from the first feed paths 236 and 236' to the second paths 237 and 237' through the first membrane groups 232 and 232', and the first cationic scaling species ($Ca^{2+}$) is transferred from the second feed paths 237 and 237' to the first feed paths 236 and 236' through the first membrane groups 232 and 232'. Further, anionic non-scaling species ($Cl^-$) is transferred from the second flow path 237 and 237' to the fourth flow paths 238 and 238' through the second membrane group 233, anionic non-scaling species $Cl^-$ is transferred from the second flow paths 237 and 237' to the first flow paths 236 and 236' through the second membrane groups 233 and 233', and the cationic non-scaling species $Na^+$ is transferred from the first feed path 236 to the third feed path 235 through the third membrane group 231.

Since the first anionic scaling species ($HCO_3^-$) and first cationic scaling species ($Ca^{2+}$) are located in separate feed path streams when they exit the electrodialysis device 2 in the form of effluent from the first feed path outlets 242 and 242' and the second feed path outlets 243 and 243', the scaling species are no longer a scaling risk. Accordingly, the effluent from the first feed path outlets 242 and 242' and the second feed path outlets 243 and 243' can be provided to a desalination plant where the effluents can be processed separately to high recovery.

Additionally, it is contemplated that in some embodiments of electrolysis device having multiple first and second feed path outlets, the multiple first feed path outlets (e.g. 242, 242') can be merged into a combined first feed path outlet 342 and the multiple second feed path outlets e.g. (243, 243') can be merged into a combined second feed path outlet 343. In other embodiments of electrolysis device having multiple first and second feed path outlets (e.g. 242, 242', 243, 243'), the outlets are kept separated.

Accordingly, in embodiments containing two or more general cell units 23, it is understood that the second part of the first feed path 236$b$ of the first general cell unit 23 would be at least partially defined by one or more elements of the second membrane group of the highest order general cell unit.

As can be seen, in FIG. 7$c$, in the first general cell unit 23, the entirety of the effluent from the first section of the first feed path 236$a$ flows into the second section of the first feed path 236$b$, and the entirety of the effluent from the first section of the second feed path 237$a$ flows into the second section of the second feed path 237$b$. Further, in the second general cell unit 23', the entirety of the effluent from the first section of the first feed path 236$a'$ flows into the second section of the first feed path 236$b'$, and the entirety of the effluent from the first section of the second feed path 237$a'$ flows into the second section of the second feed path 237$b'$.

However, in the embodiment shown in FIG. 7$d$, the effluent from the first part of the first flow paths of the first and second general units 236$a$ and 236$a'$ is directed into the first flow paths conduit 246 where the effluents are combined and delivered to the second flow paths of the first and second general units 236$b$ and 236$b'$. Further, the effluent from the first part of the first flow paths of the first and second general units 237$a$ and 237$a'$ is directed into the first flow paths conduit 247 where the effluents are combined and delivered to the second flow paths of the first and second general units 237$b$ and 237$b'$. Further, in this embodiment shown in FIGS. 7$a$-$d$, the first and second part of each membrane group is shown as having only one membrane element of each membrane group. However, a person having ordinary skill in the art can choose to use a different number of membrane elements in the first and second parts of each membrane group.

Referring to FIGS. 8 and 9, it is contemplated that in some embodiments, electrodialysis device 2 may receive a feed stream through inlet 240 of water from a variety of salt or brackish sources. The feed stream can be comprised of two or more scaling species. The feed stream is directed into first and second feed paths. The electrodialysis device 2 passivates the two or more scaling species by moving the cationic scaling species from the second feed paths to the first feed paths, and moving the anionic scaling species from the first feed paths to the second feed paths. Effluent from the first feed paths is delivered to a desalination plant intake from one or more of the first feed path outlets 242 and effluent from the second feed paths is delivered to the desalination plant intake through one or more of the second feed path outlets 243. It is contemplated that in some embodiments having multiple first and second feed path outlets 242 and 243, the multiple first feed path outlets (e.g. 242, 242') can be merged into a combined first feed path outlet 342 and the multiple second feed path outlets e.g. (243, 243') can be merged into a combined second feed path outlet 343. The contents of the first feed paths do not mix with the contents of the second feed paths once they exit electrodialysis device 2. The contents of the first and second feed paths are processed separately in the desalination plant to a high recovery.

Additionally, it is contemplated that this invention is further comprised of a method for passivating a scaling species through the use of the electrodialysis apparatus described above. In one embodiment, the method is comprised of passing a direct current through a pair of electrodes in the electrodialysis device, so as to energize the pair of electrodes respectively as a cathode and an anode, and supplying a feed stream to the one or more inlets of the electrodialysis device. The one or more inlets direct the feed stream to a first feed path and a second feed path. The first feed path and the second feed path are separated by a first membrane group. The feed stream is comprised of at least a first anionic scaling species, a first cationic scaling species, a first anionic non-scaling species, and a first cationic non-scaling species. In some embodiments, the feed stream is comprised of additional scaling and/or non-scaling species.

While travelling down the first and second feed paths, the first cationic scaling species is transferred from the second feed path, through the first membrane group, and into the first feed path. Further, the first anionic scaling species is transferred from the first feed path, through the first membrane group, and into the second feed path.

In some embodiments in which the feed stream contains more than one anionic and cationic scaling species, while travelling down the first and second feed paths, the additional cationic scaling species are transferred from the second feed path, through the first membrane group, and into the first feed path. Further, additional anionic scaling species are transferred from the first feed path, through the first membrane group, and into the second feed path.

The method is further comprised of removing the effluent from the first feed path through a first feed path outlet and removing the effluent from the second feed path through a second feed path outlet. In one embodiment, the first and second feed path outlets direct the effluent to the inlet of a desalination unit where the effluent from the first feed path is processed separately from the effluent from the second feed path.

In one embodiment of the method, the scaling species are selected from the group consisting of $CaSO_4$, $CaCO_3$, $Mg(OH)_2$, $CaF_2$, $SrSO_4$, $BaSO_4$, and $Ca_3(PO_4)_2$.

In one embodiment, the concentration of the first anionic scaling species in effluent removed from the first feed path is less than about 90% of the concentration of the first anionic scaling species in the feed stream entering the first feed path. Further, wherein the concentration of the first cationic scaling species in effluent removed from the second feed path is less than about 90% of the concentration of first cationic scaling species in the feed stream entering the second feed path.

In another embodiment, the concentration of the first anionic scaling species in effluent removed from the first feed path is less than about 50% of the concentration of the first anionic scaling species in the feed stream entering the first feed path. Further, wherein the concentration of the first cationic scaling species in effluent removed from the second feed path is less than about 50% of the concentration of first cationic scaling species in the feed stream entering the second feed path.

In an additional embodiment, the concentration of the first anionic scaling species in effluent removed from the first feed path is less than about 20% of the concentration of the first anionic scaling species in the feed stream entering the first feed path. Further, wherein the concentration of the first cationic scaling species in effluent removed from the second feed path is less than about 20% of the concentration of first cationic scaling species in the feed stream entering the second feed path.

In one embodiment, the concentration of the first anionic scaling species in effluent exiting the electrodialysis device through the first feed path outlet is less than about 90% of the concentration of the first anionic scaling species in the feed stream entering the electrodialysis device. Further, wherein the concentration of the first cationic scaling species in effluent exiting the electrodialysis device through the second feed path outlet is less than about 90% of the concentration of first cationic scaling species in the feed stream entering the electrodialysis device.

In another embodiment, the concentration of the first anionic scaling species in effluent exiting the electrodialysis device through the first feed path outlet is less than about 50% of the concentration of the first anionic scaling species in the feed stream entering the electrodialysis device. Further, wherein the concentration of the first cationic scaling species in effluent exiting the electrodialysis device through the second feed path outlet is less than about 50% of the concentration of first cationic scaling species in the feed stream entering the electrodialysis device.

In an additional embodiment, the concentration of the first anionic scaling species in effluent exiting the electrodialysis device through the first feed path outlet is less than about 20% of the concentration of the first anionic scaling species in the feed stream entering the electrodialysis device. Further, wherein the concentration of the first cationic scaling species in effluent exiting the electrodialysis device through the second feed path outlet is less than about 20% of the concentration of first cationic scaling species in the feed stream entering the electrodialysis device.

In one embodiment, the concentration of the second anionic scaling species in effluent removed from the first feed path is less than about 90% of the concentration of the second anionic scaling species in the feed stream entering the first feed path. Further, wherein the concentration of the second cationic scaling species in effluent removed from the second feed path is less than about 90% of the concentration of second cationic scaling species in the feed stream entering the second feed path.

In another embodiment, the concentration of the second anionic scaling species in effluent removed from the first feed path is less than about 50% of the concentration of the second anionic scaling species in the feed stream entering the first feed path. Further, wherein the concentration of the second cationic scaling species in effluent removed from the second feed path is less than about 50% of the concentration of second cationic scaling species in the feed stream entering the second feed path.

In an additional embodiment, the concentration of the second anionic scaling species in effluent removed from the first feed path is less than about 20% of the concentration of the second anionic scaling species in the feed stream entering the first feed path. Further, wherein the concentration of the second cationic scaling species in effluent removed from the second feed path is less than about 20% of the concentration of second cationic scaling species in the feed stream entering the second feed path.

In one embodiment, the concentration of the second anionic scaling species in effluent exiting the electrodialysis device through the first feed path outlet is less than about 90% of the concentration of the second anionic scaling species in the feed stream entering the electrodialysis device. Further, wherein the concentration of the second cationic scaling species in effluent exiting the electrodialysis device through the second feed path outlet is less than about 90% of the concentration of second cationic scaling species in the feed stream entering the electrodialysis device.

In another embodiment, the concentration of the second anionic scaling species in effluent exiting the electrodialysis device through the first feed path outlet is less than about 50% of the concentration of the second anionic scaling species in the feed stream entering the electrodialysis device. Further, wherein the concentration of the second cationic scaling species in effluent exiting the electrodialysis device through the second feed path outlet is less than about 50% of the concentration of second cationic scaling species in the feed stream entering the electrodialysis device.

In an additional embodiment, the concentration of the second anionic scaling species in effluent exiting the electrodialysis device through the first feed path outlet is less than about 20% of the concentration of the second anionic scaling species in the feed stream entering the electrodialysis device. Further, wherein the concentration of the second cationic scaling species in effluent exiting the electrodialysis device through the second feed path outlet is less than about 20% of the concentration of second cationic scaling species in the feed stream entering the electrodialysis device.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Therefore, the technical scope of the present invention encompasses not only those embodiments described above, but also all that fall within the scope of the appended claims.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal language of the claims.

What is claimed is:

1. An electrodialysis device comprising
   a) a vessel
   b) a cathode and an anode in said vessel in operative association with a source of direct current;
   c) a first feed path;
   d) a second feed path;
   e) a feed inlet providing an aqueous feed stream flow from an upstream direction to a downstream direction through both said first feed path and said second flow path, said feedstream comprising anionic scale imparting species (ASIS) present in a first (ASIS) concentration, cationic scale imparting species (CSIS) present in a first (CSIS) concentration, anionic non scale imparting species (ANSIS) and cationic non scale imparting species (CNSIS);
   f) a first membrane group separating said first feed path and said second feed path, said first membrane group comprising at least two elements i) and ii); wherein: i) is an anion selective membrane permitting transfer of (ASIS) from said first feed path to said second feed path, ii) is a cation selective membrane permitting transfer of (CSIS) from said second feed path to said first feed path;
   g) a second membrane in fluid communication with said second feed path, said second membrane permitting passage of (ANSIS) therethrough and out of said second feed path;
   h) a third membrane in fluid communication with said first feed path, said third membrane permitting passage of (CNSIS) therethrough and out of said first feed path;
   i) a first feed path outlet downstream from said first feed path adapted to carry a first effluent therein having a reduced (ASIS) concentration compared with said first (ASIS) concentration;
   j) a second feed path outlet downstream from said second feed path adapted to carry a second effluent therein having a reduced (CSIS) concentration compared to said first (CSIS) concentration.

2. The electrodialysis device of claim 1, wherein said first membrane group elements f) i) are selected from the group consisting of a monovalent selective anion exchange membranes, and divalent selective anion exchange membranes, and said first membrane group elements f) ii) are selected from monovalent selective cation exchange membranes and divalent selective cation exchange membranes.

3. The electrodialysis device of claim 1, wherein said second membrane is comprised of at least one anion exchange membrane element.

4. The electrodialysis device of claim 1, wherein said third membrane is comprised of at least one cation exchange membrane element.

5. The electrodialysis device of claim 1, wherein said (CSIS) is selected from the group consisting of $Mg^{2+}$, $Ca^{2+}$, $Sr^{2+}$, and $Ba^{2+}$, and said (ASIS) is selected from the group consisting of $SO_4^{2-}$, $HCO_3^-$, $CO_3^{2+}$, $OH^-$, $F^-$, $PO_4^{3-}$, $HPO_4^{2-}$, and $H_2PO_4^-$.

6. An electrodialysis device as recited in claim 1 in combination with a desalination unit (DSU), said DSU having a DSU feed stream inlet wherein either but not both of said first feed path outlet and said second feed path outlet are in fluid communication with said DSU feed stream inlet.

* * * * *